UNITED STATES PATENT OFFICE.

CARL RACH, OF CHICAGO, ILLINOIS.

MALTED FOOD.

SPECIFICATION forming part of Letters Patent No. 573,236, dated December 15, 1896.

Application filed November 9, 1895. Serial No. 568,486. (No specimens.)

*To all whom it may concern:*

Be it known that I, CARL RACH, a subject of the King of Prussia, German Emperor, residing at Chicago, in the county of Cook and State of Illinois, have invented a certain new and useful Food Preparation, of which the following is a specification.

My invention relates to the preparation of certain food products, and to the process of producing such food products, and to the product obtained by the process. I do not wish to be understood as attempting here to set forth every process by which my product may be obtained, but only to set out one method, which, as at present advised, seems to be the most convenient and therefore the best; but other analogous means can easily be devised, and variations or changes in the process might be made by a skilled chemist.

The product which I produce, broadly considered, consists of the extract of malt freed from malt-sugar combined with the solids of milk.

In malt extracts and combinations thereof, either dry or in liquid form, which are known to the public it will be found that malt-sugar is an important constituent and it has been commonly supposed to be necessary. The process which I employ here therefore embraces such steps as are necessary to produce the malt extract and then to free it from malt-sugar and then to combine it with solids of milk.

I will now describe my process.

I take a quantity of malt-flour and mix the same with hot water at a temperature of about 169° or 170° Fahrenheit. This "malt-flour," so called, may consist of fifty per cent. of malt-flour and fifty per cent. of flour obtained from other sources, as, for example, wheat, rice, or corn, the whole being properly ground, mixed, and freed from husk. In short, in this specification where I use the term "malt-flour" without other explanation it may be understood as malt-flour proper, or as mixed malt-flour in combination with other flours, such as I have described, and which in such combination operates satisfactorily in my process. I am careful not to permit this temperature to fall below 169°, for I have found by experiment that when the temperature is below this point the quantity of malt-sugar produced is considerable. In other words, I keep it at a temperature which will produce the least possible malt-sugar. This work may be done in a steam-jacketed vacuum-pressure kettle. The mixture is here stirred by any suitable apparatus familiarly known for that purpose, and the steam is turned on and the temperature, as before suggested, is regulated to keep it from falling below the minimum point, which for convenience I would here suggest as being 169° Fahrenheit. In producing this mixture I find that the most satisfactory proportions would be about as follows: one-half of a pound of malt-flour proper, one-half of a pound of wheat or other flour, and two and one-half pounds of water. If malt-flour proper alone were used, the proportions would be the same, or about one pound of malt-flour to two and one-half pounds of water. The diastase of the malt during this process will act upon the starch in the flour, changing it into dextrin and malt-sugar. This action takes place whether I use mixed malt-flour, as I have described it, or malt-flour proper.

In order that there may be the least possible malt-sugar produced, the mixture is closely watched and tested, and as soon as it is found that the starch reaction has ceased and it is found that no more unchanged starch is present the temperature is immediately raised to the boiling-point. This state of the substance can be determined by the iodine test, for as soon as the starch reaction has ceased the iodine test will no longer produce a blue color. I now evaporate the water from this mixture under atmospheric pressure, and then *in vacuo* until the preparation comes to a syrupy condition, containing from twenty-five to thirty per cent. water. I now add a sufficient quantity of alcohol containing in one hundred parts of weight about ninety parts by weight of alcohol and ten parts of water. The quantity of course must be determined by the particular circumstances of the case; but about one quart for every pound of flour used in the preparation would ordinarily be approximately correct. The action of this alcohol under these conditions is to separate the albuminoids, dextrin, and mineral matter of the preparation from the malt-sugar by dissolving the malt-sugar in the alcohol. The stirring process will of course continue to thoroughly mix the substances. The alcoholic malt-sugar solution is drawn off in any suitable manner, the solids remaining in the kettle. These solids or the residue consists of the extract of malt freed from malt-sugar. This malt-sugar, to get rid of which is an important part of my invention, has numerous disagreeable properties. It is easily fermentable and causes various kinds of stomach trouble if taken in considerable quantities. For this and many other reasons, which will be known to physiologists, it is desirable to rid the malt extract from the malt-sugar, and I do it in the manner above suggested. This malt-sugar seems to me invariably produced during the conversion of the starch by the influence of diastase, and it is necessary to separate the malt-sugar from all other compounds in some such manner as above set forth. This malt extract, if desired, can be sweetened by the addition of any proper proportions of cane-sugar; but this is no particular part of the invention. This extract of malt free from malt-sugar is now combined with solids of milk in the proportion of three-fourths of a pound of extract of malt to each quart of milk, and the mixture is evaporated to dryness *in vacuo*.

I claim—

1. As a new article of food, extract of malt freed from malt-sugar in combination with the solids of milk, substantially as described.

2. The process of freeing the extract of malt from its malt-sugar which consists in mixing the malt-flour with water at a high temperature until the starch reaction ceases, then raising the same to a higher temperature, then evaporating the water until it is brought to a syrupy condition, then thoroughly mixing the same with alcohol until the malt-sugar is dissolved by the alcohol, then drawing off the alcoholic malt-sugar solution, then mixing the residue with milk, then evaporating this mixture to dryness *in vacuo*.

CARL RACH.

Witnesses:
 FRANCIS W. PARKER,
 LILLEY JOHNSTONE.